United States Patent
Godlieb

(10) Patent No.: US 10,656,604 B2
(45) Date of Patent: May 19, 2020

(54) SYSTEM FOR DETERMINING A RELATIVE ORIENTATION OF A DEVICE TO A USER

(71) Applicant: KONINKLIJKE PHILIPS N.V., Eindhoven (NL)

(72) Inventor: Robert Godlieb, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 203 days.

(21) Appl. No.: 15/542,807

(22) PCT Filed: Jan. 11, 2016

(86) PCT No.: PCT/EP2016/050323
§ 371 (c)(1),
(2) Date: Jul. 11, 2017

(87) PCT Pub. No.: WO2016/113202
PCT Pub. Date: Jul. 21, 2016

(65) Prior Publication Data
US 2018/0024507 A1 Jan. 25, 2018

(30) Foreign Application Priority Data
Jan. 15, 2015 (EP) .................................... 15151240

(51) Int. Cl.
*G05B 11/01* (2006.01)
*A45D 20/12* (2006.01)
(Continued)

(52) U.S. Cl.
CPC .............. *G05B 11/01* (2013.01); *A45D 20/12* (2013.01); *A61C 17/221* (2013.01);
(Continued)

(58) Field of Classification Search
CPC ....... G05B 11/01; A45D 20/12; A61C 17/221; B26B 19/388; G01B 21/16; G01B 21/22; G01C 9/00; G01C 21/165; G01P 15/00
(Continued)

(56) References Cited

U.S. PATENT DOCUMENTS 9,347,968 B2 5/2016 Yagi
10,203,203 B2 2/2019 Sakurai
(Continued)

FOREIGN PATENT DOCUMENTS

| JP | H11104064 | 4/1999 |
|---|---|---|
| WO | 2013096572 A1 | 6/2013 |
| WO | 2013163999 A1 | 11/2013 |

*Primary Examiner* — Michael P Nghiem
*Assistant Examiner* — Dacthang P Ngo

(57) ABSTRACT

A system for determining an orientation of a first device relative to a user includes a first device including a first orientation measuring unit configured to measure an orientation of the first device relative to the earth, a second device configured to be worn by the user on a body part. The second device includes a second orientation measuring unit configured to measure an orientation of the second device relative to the earth. The system also has a processor configured to calculate an orientation of the first device relative to the second device by comparing the measured orientation of the first device relative to the earth with the measured orientation of the second device relative to the earth.

20 Claims, 5 Drawing Sheets

(51) Int. Cl.
*A61C 17/22* (2006.01)
*B26B 19/38* (2006.01)
*G01C 9/00* (2006.01)
*G01B 21/16* (2006.01)
*G01C 21/16* (2006.01)
*G01B 21/22* (2006.01)
*G01P 15/00* (2006.01)

(52) U.S. Cl.
CPC ............ *B26B 19/388* (2013.01); *G01B 21/16* (2013.01); *G01B 21/22* (2013.01); *G01C 9/00* (2013.01); *G01C 21/165* (2013.01); *G01P 15/00* (2013.01)

(58) Field of Classification Search
USPC ........................................................ 702/150
See application file for complete search history.

(56) References Cited

U.S. PATENT DOCUMENTS

| | | | |
|---|---|---|---|
| 2008/0015031 A1 | 1/2008 | Koizumi | |
| 2012/0085934 A1* | 4/2012 | Marcelis | G01S 5/18 250/491.1 |
| 2013/0041577 A1 | 2/2013 | Puhalla | |
| 2014/0200734 A1* | 7/2014 | Krenik | G05B 15/02 700/302 |
| 2015/0321365 A1* | 11/2015 | Lauritsen | B26B 21/4081 83/75.5 |
| 2017/0079421 A1* | 3/2017 | Tamminga | A61C 17/221 |

* cited by examiner

SYSTEM FOR DETERMINING A RELATIVE ORIENTATION OF A DEVICE TO A USER

This application is the U.S. National Phase application under 35 U.S.C. § 371 of International Application No. PCT/EP2016/050323, filed on Jan. 11, 2016, which claims the benefit of International Application No. 15151240.7 filed on Jan. 15, 2015. These applications are hereby incorporated by reference herein.

FIELD OF THE INVENTION

The present invention relates to a system for determining a relative orientation of a device to a user.

BACKGROUND OF THE INVENTION

In recent years, there has been an increasing demand for "smart" personal care appliances that are capable of performing functionalities by detecting a number of physical parameters associated with a user. For example, the use of personal care appliances, such as toothbrushes, hair clippers, beard trimmers, hairdryers, etc. can be improved by changing the function of the appliance depending on the relative orientation and/or position of the appliance to the user.

Several methods have been described for determining the orientation of an appliance relative to a user, in particular a body part of a user (e.g. head). For example, in some conventional arrangements, the intensity and/or temperature of the airflow from a hairdryer can be adjusted according to the distance and/or angle of the airflow relative to a user's head.

There are a number of conventional methods for determining a relative orientation and/or position of a device to a user, and modifying the functionality of the device in some way depending on the determined orientation and/or position. For example, some conventional personal care appliances comprise an electromagnetic field sensor that is used in conjunction with a user head tracking device that comprises another electromagnetic field sensor. In such systems, the data captured by the electromagnetic field sensors from both the personal care appliance and the user head tracking device are transmitted to an embedded computer system such that the position and rotation of the personal care appliance can be monitored.

In conventional systems, using an electromagnetic system to determine the relative orientation of the appliance and the user requires a large amount of sensing hardware and processing powers.

SUMMARY OF THE INVENTION

It is an object of the invention to provide a system that is capable of measuring an orientation of a first device relative to a second device, the second device being worn by a user, and a technique for measuring an orientation of a first device relative to a second device which substantially alleviates or overcomes the problems mentioned above.

According to an aspect of the present invention, there is provided a system for determining an orientation of a first device relative to a user, comprising: a first device including a first orientation measuring unit arranged to measure an orientation of the first device relative to the earth; a second device associated with the user, the second device including a second orientation measuring unit arranged to measure an orientation of the second device relative to the earth; and a processing unit arranged to calculate an orientation of the first device relative to the second device by comparing the measured orientation of the first device relative to the earth with the measured orientation of the second device relative to the earth.

Hence, such a system can determine an orientation of a first device relative to a user by comparing the orientation of the first device relative to the earth with the orientation of the second device worn by the user relative to the earth. This provides a convenient way of determining an orientation of a first device relative to a user that is very efficient in terms of required processing power.

The first orientation measuring unit and the second orientation measuring unit may be accelerometer. By placing an accelerometer in the first device, the relative orientation of the appliance to the world is known. By placing an accelerometer on a second device at fixed position on the person on the relevant body part, the relative orientation of the person to the world is known. By comparing (e.g. by geometric subtraction) these orientations the orientation of the appliance relative to the person or person's relevant body part can be determined.

By combining the orientation to the position that is determined by another method (such as an electro-magnetic field sensor or a laser-distance sensor based subsystem), the location of the first device (e.g. an appliance) relative to the person is determined.

In some embodiments, the second device is arranged to be worn by the user on a body part.

In some embodiments, the first device is arranged to adjust a functionality of the first device based on the orientation of a first device relative to the user.

In some embodiments, the first device further comprises a first communication unit, and the second device further comprises a second communication unit, wherein the second communication unit is arranged to transmit the measured orientation of the second device relative to the earth to the first communication unit.

In some embodiments, the processing unit is arranged to calculate the orientation of the first device relative to the second device by performing geometric subtraction of the measured orientation of the first device relative to the earth and the measured orientation of the second device relative to the earth.

In some embodiments, the first orientation measuring unit comprises at least one of: an accelerometer, a gyroscope, and a digital inclinometer, and the second orientation measuring unit comprises an accelerometer, a gyroscope, compass, a north-finder, and a digital inclinometer.

In some embodiments, the processing unit is located in at least one of: the first device, the second device, and a third device.

In some embodiments, the system further comprises a position measuring unit arranged to measure a relative position of the first device to the second device. By determining an orientation of a first device relative to a user by comparing the orientation of the first device relative to the earth with the orientation of the second device worn by the user relative to the earth, and combining this with measuring a relative position of the first device to the second device (e.g. using an electromagnetic field sensor or a laser-distance sensor), the location of the first device relative to the person is determined in a very efficient way. For example, this uses considerably less processing power than using a location based system for determining both position and orientation.

In some embodiments, the position measuring unit is located in at least one of: the first device, the second device, and a third device. In some embodiments, the second device may be a distributed device.

In some embodiments, the first position measuring unit comprises an electromagnetic field sensor or a laser-distance sensor.

In some embodiments, the first device is further arranged to adjust a functionality of the first device based on the relative orientation of the first device to the second device and on the relative position of the first device to the second device.

In some embodiments, the first device is a personal appliance including any one of an electric shaver, a hair clipper, a beard trimmer, an electric toothbrush, a hair dryer, skin care device, cleansing appliance, and a beauty appliance.

According to an aspect of the invention, there is provided a device comprising: a first orientation measuring unit arranged to measure an orientation of the first device relative to the earth; a first communication unit arranged to receive an orientation of a second device relative to the earth, the second device being worn by the user; and a processing unit arranged to calculate an orientation of the first device relative to the user by comparing the measured orientation of the first device to the received orientation of the second device.

In some embodiments, the device is further arranged to adjust its functionality based on the relative orientation of the first device to the user.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1:
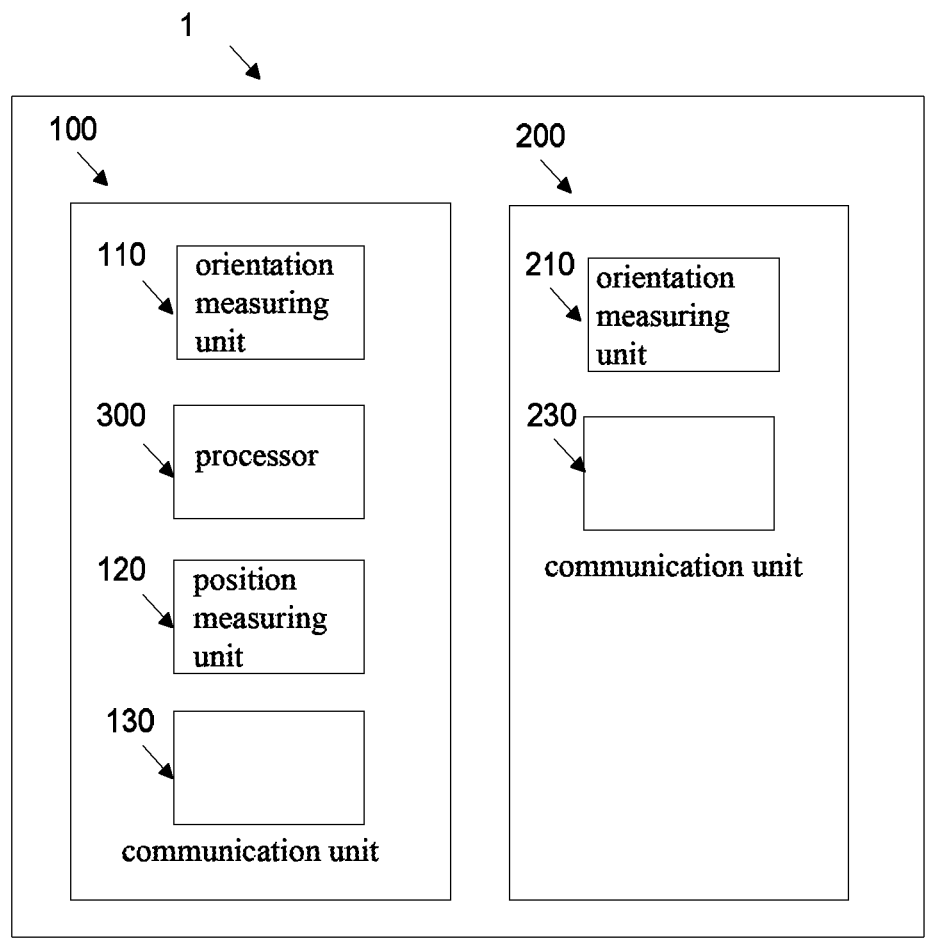
FIG. 1 a block diagram of a system according to a first embodiment of the present invention.

FIG. 1 is a block diagram of a system according to an embodiment of the present invention.

As illustrated in FIG. 1, there is provided a system 1 comprising a first device 100 and a second device 200. The system 1 is arranged to determine a relative orientation of the first device 100 to the second device 200. In this embodiment, the second device 200 is arranged to be worn on a body part of a user. As a result, it can be assumed in this embodiment that the orientation of the second device 200 to the user is fixed. Hence, a relative orientation of the first device 100 to the user can be determined on the basis of the relative orientation of the first device 100 to the second device 200.

In particular, in this embodiment, the first device 100 is a hair clipper and the second device 200 is an in-ear head tracking device that can be worn by the user in his/her ear in a fixed position.

The first device 100 comprises a first orientation measuring unit 110, a first position measuring unit 120, a first communication unit 130, and a processing unit 300.

It will also be appreciated that the first device 100 will have a number of components related to the hair clipping/trimming functionality of the first device 100 that are not shown in FIG. 1 for the sake of convenience. As described below, in this embodiment, the hair clipping/trimming functionality of the first device 100 can be adjusted based on the relative orientation and relative position of the first and second devices.

In this embodiment, the first orientation measuring unit 110 is an accelerometer capable of measuring acceleration of the first device 100 and translating the measured acceleration data into an orientation of the first device 100 relative to the earth. Hence, the first orientation measuring unit 110 is arranged to measure an orientation of the first device relative to the earth.

The orientation of the first device 100 relative to the earth measured by the first orientation measuring unit 110 is communicated to the processing unit 300.

The first position measuring unit 120 is arranged to measure a relative position of the first device 100 to the second device 200. In this embodiment, the first position measuring unit 120 is an electromagnetic field sensor, for example of the type described in WO2013163999.

The measured relative position of the first device 100 to the second device 200 is communicated to processing unit 300.

The first communication unit 130 is arranged to receive a measured orientation of the second device 200 relative to the earth from the second communication unit 230 of the second device 200. The first communication unit 130 in this embodiment is a Bluetooth wireless interface in communication with the second communication unit 230 of the second device 200, which is also a Bluetooth wireless interface.

The second device 200 comprises a second orientation measuring unit 210 and a second communication unit 230.

In this embodiment, the second device 200 is an in-ear head tracking device which is to be worn by the user at a fixed position in the ear (i.e. with a fixed orientation) when the system is in use. Therefore, the orientation of the second device 200 relative to the earth is indicative of the orientation of the head of the user.

In this embodiment, the second orientation measuring unit 210 is an accelerometer capable of measuring acceleration of the second device 200 and translating the measured acceleration data into an orientation of the second device 200 relative to the earth. Hence, second orientation measuring unit 210 is arranged to measure an orientation of the second device relative to the earth.

In this embodiment, the measured orientation of the second device 200 relative to the earth is transmitted by the second communication unit 230 to the first communication unit 130.

The processing unit 300 is arranged to adjust the hair clipping/trimming functionality of the first device 100 based on the relative orientation and relative position of the first device 100 to the second device 200.

In this embodiment, the processing unit 300 receives the orientation of the first device 100 relative to the earth measured by the first orientation measuring unit 110, and the orientation of the second device 200 relative to the earth received by the first communication unit 130. The processing unit 300 also receives the relative position of the first device 100 to the second device 200 measured by the first position measuring unit 120.

The processing unit 300 calculates a relative orientation of the first device 100 to the second device 200 by comparing the measured orientation of the first device 100 relative to the earth to the measured orientation of the second device 200 relative to the earth.

Specifically, in this embodiment, the processing unit 300 performs geometric subtraction on the measured orientation of the first device 100 relative to the earth and the measured orientation of the second device 200 so as to obtain a relative orientation of the first device 100 to the second device 200.

In this embodiment, processing unit 300 combines the calculated relative orientation of the first and second device 100 with the relative position of the first device with respect to the second device measured by the first position measuring unit 120. In this embodiment, the processing unit 300 is arranged to use this relative orientation and relative position information to adjust the hair clipping/trimming functionality of the first device 100. For example, the strength of the hair clipper operation can be reduced or increased when it is determined that the relative orientation of the first device 100 to the second device 200 is within a predetermined range.

Figure 2:
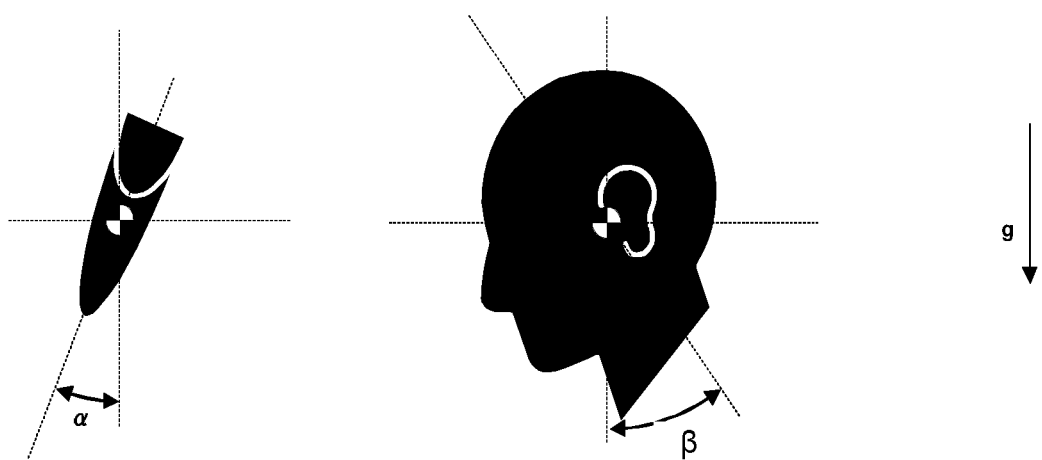
FIG. 2 is a diagram illustrating an orientation of a first device relative to the earth and an orientation of a second device relative to the earth from a side view, according to the first embodiment of the present invention.

FIG. 2 is a diagram illustrating an orientation of the first device 100 relative to the earth and an orientation of a second device 200 relative to the earth from a side view, according to the first embodiment of the present invention.

The first device 100 (i.e. a hair clipper) is at an orientation making an angle α relative to vertical, and the in-ear head tracking device 200 is at an orientation making an angle β relative to vertical. The angle β is also indicative of an orientation of the user's head relative to the earth's plane, as the in-ear head tracking device is fixed in position on the ear of the user. Gravitational acceleration is denoted by g in FIG. 2. It will be appreciated that although orientations and angles are shown with respect to one plane with reference to FIG. 2, this is merely for ease of illustration.

In this embodiment, the first orientation measuring unit 110 is arranged to measure the orientation of the first device 100 relative to earth as a set of angles. This is then communicated from the first orientation measuring unit 110 to processing unit 300.

The in-ear head tracking device 200 comprises a second orientation measuring unit 210 that is configured to measure an orientation of the second device 200. In this embodiment, the second orientation measuring unit 210 is an accelerometer and is arranged to measure the orientation of the second device 200 relative to the earth as a set of angles. This is then communicated from the second orientation measuring unit 210 to the second communication unit 230. The second communication unit 230 then transmits the set of angles to the first communication unit 130 of the first device 100. Then, the first communication unit 130 communicates this to the processing unit 300.

The processing unit 300 is then arranged to perform geometric subtraction of the set of angles indicating the orientation of the first device 100 relative to earth and the set of angles indicating the orientation of the second device 100 relative to earth. For example, considering the orientation with respect to vertical, the processing unit 300 subtracts angle α (associated with the first device 100) and the angle β (associated with the second device 100) to produce an angle γ that is the relative vertical orientation of the first devices.

In order for orientation of the hair clipper 100 and the in-ear head tracking device 200 to be measured accurately, the motion change (acceleration) of the first device 100 and the second device is preferably low relative to the gravitational acceleration (g). In use, the net average acceleration of the accelerator 110 and the accelerator 210 comprised in the hair clipper 100 and the in-ear head tracking device 200 over a longer period of time will indicate the gravity direction. Additional to this method, from the position measuring unit the change over time in the position is known. From this the accelerations due to this position change can be determined by integration over time. In practice the subtraction of accelerations due to position changes from the accelerator measurements yields the instantaneous, short time-frame measure of the orientation relative to the earth. The longer time-frame (approx.>20 seconds) net averaging ensures longer time-frame correctness and prevents drift over time.

During practical use of hair clipper 100, there is no sustained accelerating in a single direction over a longer period (e.g. more than 5 seconds). This allows using the average of readings of the accelerators comprised within the hair clipper 100 and/or the in-era head tracking device 200 to measure an orientation for relatively calm operation (e.g. motions<4 Hz).

Figure 3:
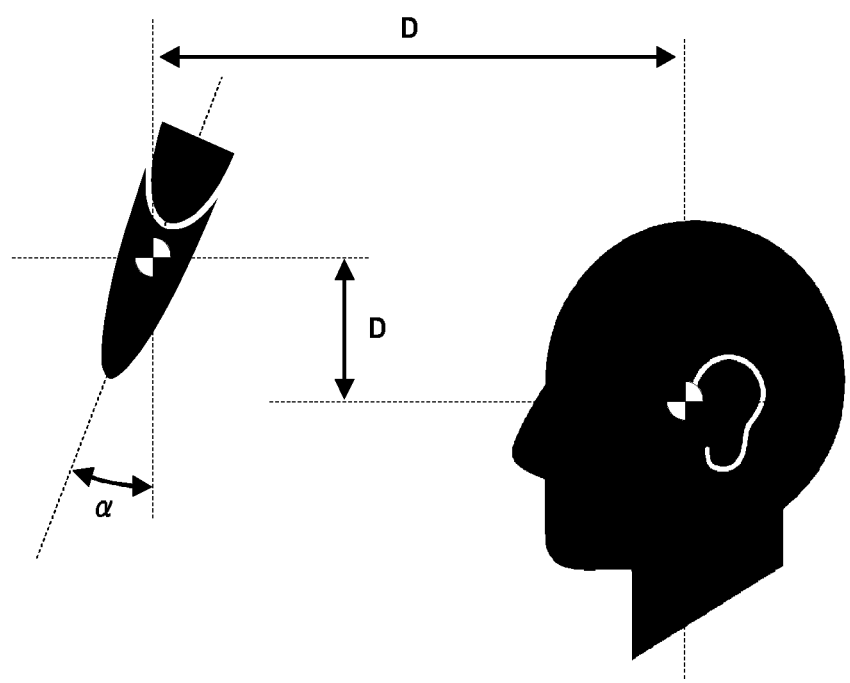
FIG. 3 is a diagram illustrating a relative orientation of a first device 100 to the head of a user from a side view, according to the first embodiment of the present invention.

FIG. 3 shows another side view of a first device 100 and a second device of the first embodiment. The first device 100 is at a relative orientation that is an angle γ to the head of the user with respect to vertical. With reference to FIG. 2, the angle γ is obtained by the geometric subtraction of the angle α (associated with the first device 100 relative to the earth's plane) and the angle β (associated with the second device 200).

A first distance between a vertical axis of the hair clipper 100 and a vertical axis of the in-ear head tracking device 200 is denoted as D1 in FIG. 3. A second distance between a horizontal axis of the hair clipper 100 and a horizontal axis of the in-ear head tracking device 200 is denoted as D2 in FIG. 3. These correspond to the relative distance of the first device 100 to the second device 200 as described above.

In practice these D1 and D2 (in a plane) or D1, D2 and D3 (in space) are measured using distance measuring to the first device from the second device, having as benefit that the second device has the dimension (especially the in-ear embodiment) to enable to deduce the position from the deltas between the values from extremities of the second device.

The processing unit 300 is configured to use distance D1 and distance D2 in order to determine the relative location of the first device 100 to the second device 200. In this embodiment, this is used with relative orientation information to perform adjustments in terms of hair clipping/trimming functionality.

Figure 4:
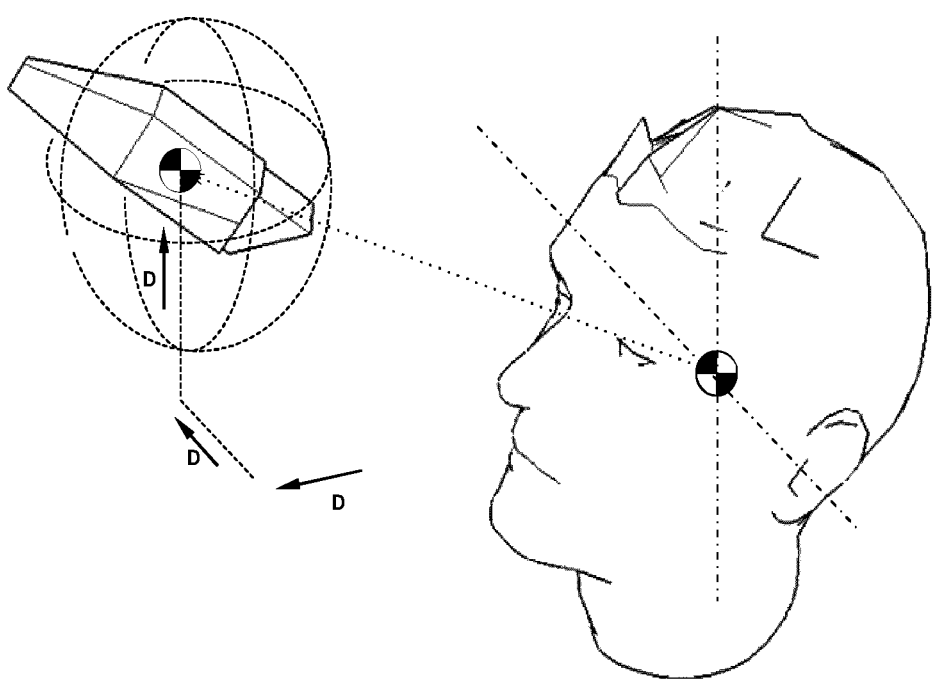
FIG. 4 is a diagram illustrating a relative orientation of a first device 100 to the head of a user from a side view, according to the first embodiment of the present invention.

FIG. 4 shows a schematic of first device 100 and the second device 200. The position measuring system yields the position of the first device relative to the second device (i.e. same as user)—the distances D in FIG. 4 (which can be expressed as Cartesian or as polar coordinates).

It will be appreciated from this that it is possible, but harder and cumbersome, for the positioning system to determine the orientation of the first device relative to the second device (indicated by the three rotations in FIG. 4). Hence, embodiments of the invention provide an efficient way of determining orientation.

Figure 5:
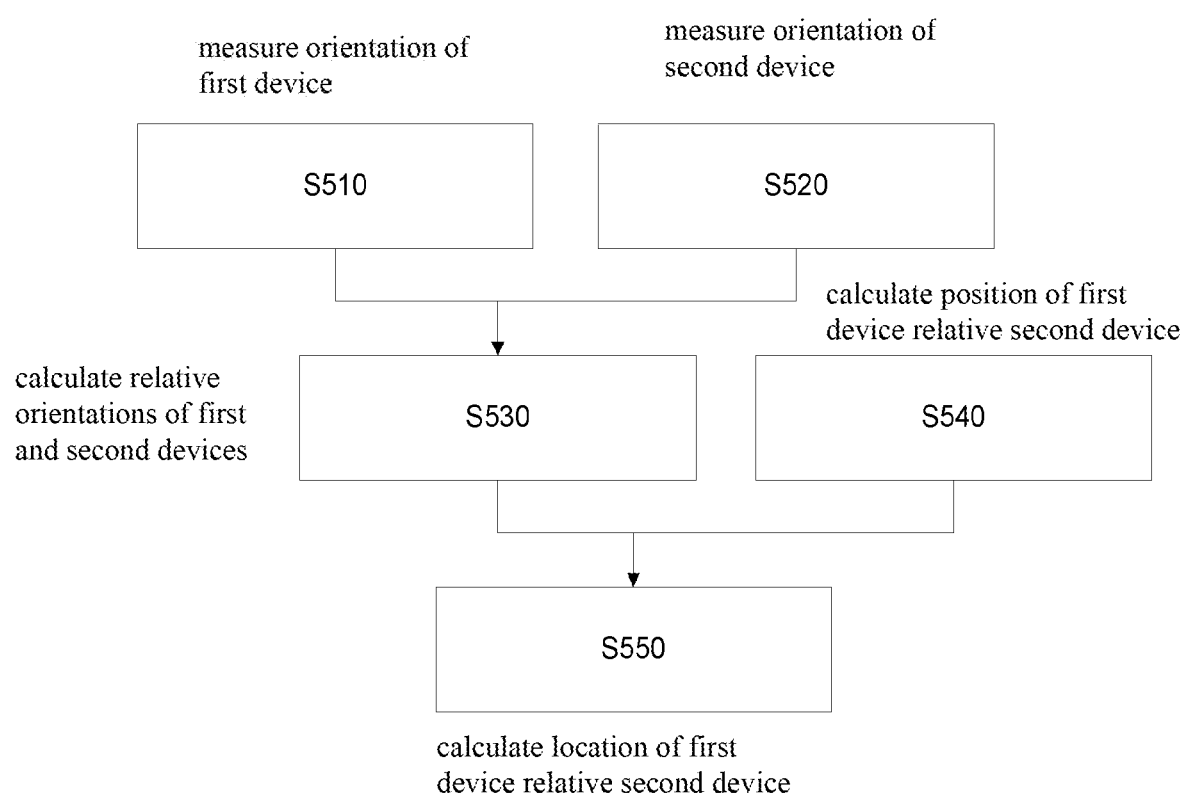
FIG. 5 is a flowchart illustrating a method for measuring a relative orientation of a first device to a second device, according to the first embodiment of the present invention.

FIG. 5 is a flowchart illustrating a method for measuring a relative orientation of the first device 100 and the second device 200 according to the first embodiment of the present invention.

At step S510 of the flowchart, the orientation of the first device 100 is measured. As explained above, the orientation of the first device 100 relative to the earth is measured by the first orientation measuring unit 110 in the first device 100. The measured orientation of the first device 100 to the earth is then communicated to the processing unit 300, which is located in the first device 100 in this embodiment.

At step S520, the orientation of the second device 200 is measured by the second orientation measuring unit 210 of the second device 2001. This step may be carried out at the same time as step S510. The orientation of the second device 200 relative to the earth is measured by the second orientation measuring unit 210 in the second device 200. The measured orientation of the second device 200 to the earth is then transmitted via the second communication unit 230 to the first communication unit 130 and then subsequently communicated to the processing unit 300 by the first communication unit 130.

At step S530, a relative orientation of the first device 100 to the second device 200 is calculated by the processing unit 300. In this step, the processing unit 300 compares the orientation of the first device 100 relative to the earth and the orientation of the second device 200 relative to the earth and performs geometric subtraction, in order to generate a relative orientation of the first device 100 to the second device 200.

At step S540, a relative position of the first device 100 to the second device 200 is measured by the first position measuring unit 120. This step can occur anytime during steps S510 to S530. The relative position of the first device 100 to the second device 200 is then communicated to the processing unit 300.

At step S550, a relative location of the first device 100 to the second device 200 is calculated by the processing unit 300, after calculating the relative orientation of the first device 100 to the second device 200 and receiving the relative position of the first device 100 to the second device 200.

It will be appreciated that in alternative embodiments, the method steps may be performed in a different sequence to what is described above, particularly in relation to the orientation and position measurements.

Based on the above, the system of the first embodiment can determine the relative orientation and relative position of a first device and a second device. Given that the second device is at a fixed position relative to the user, the relative orientation and position of the first device and the user can be determined. This can be used to alter the functionality of the first device.

In particular, the relative orientation of the first device and the second device is determined on the basis of a comparison of orientations of the first and second devices relative to the earth, rather than by a method that directly determines the relative orientations of the first and second devices (e.g. by using an electromagnetic sensor arrangement).

In conventional systems, using, for example, an electromagnetic system to determine both the relative location of the appliance to the person, and also to determine the relative orientation in addition to position requires an increased amount of sensing hardware and especially processing powers.

However, by using orientation sensors (e.g. accelerometers) on the first device and on the second device, the relative orientation can be determined by a comparison—for example, by geometric subtraction. Hence, embodiments of the invention can provide a mechanism for determining relative orientation of first and second devices (and by extension relative orientation of the first device and a user wearing the second device at a fixed orientation) that requires substantially less processing power than conventional solutions.

Embodiments of the present invention can be used to augment conventional non-contact measuring technology with a separate set of localised orientation sensors of a different technological principle to the position (distance) sensors. Using the orientation data of these orientation sensors and communicating these to a single processing unit, the relative orientation can be determined. This can be used to complement and complete a relative location determining system.

In some embodiments, by placing two accelerometers at a known distance from each other in the first device (or in the second device) an improved reading is possible of the orientation relative to the world of the appliance.

In the above described embodiment, the first device 100 determines the relative orientation and the relative position of the first and second devices. However, in other embodiments, the system may be arranged to only determine the relative orientation of the first device and the user by comparing orientations of the first and second devices relative to the earth. In such embodiments, the functionality of the first device 100 could be adjusted based only on the relative orientations of the first device and the user.

Alternatively, in some such embodiments, the first device 100 could comprise a proximity sensor. In such an embodiment, the first device 100 could determine the relative orientation and the relative position of the first and second devices and use this with data from the proximity sensor to adjust the functionality of the first device 100. For example, if the first device 100 is a hair drier, then the proximity sensor could be used to detect how far away the first device 100 is away from an object, which could be assumed in use to be the user's head. Hence, the functionality of the hair drier could be adjusted based on the relative orientations of the hair drier and the user's head and on distance away from the user's head.

In some embodiments, the relative position of the first device 100 and the second device 200 may be measured by a separate unit or a separate device (e.g. a third device in the system), which may be arranged to transmit the measured relative position of the first device 100 to the second device 200 to the processing unit 300, such that the processing unit 300 may calculate the relative location of the first device 100 to the second device 200 by combining the measured relative position and the calculated relative orientation.

Furthermore, in some embodiments, the relative position of the first device 100 and the second device 200 may be measured by a unit included in the second device 200. In such embodiments, the relative position of the first device 100 to the second device 200 may be transmitted to the processing unit 300 so as to calculate the relative location of the first device 100 to the second device 200.

Although the processing unit 300 is shown in the first device 100 in FIG. 1, embodiments of the invention are not limited in this way. The processing unit 300 may be located in the second device 200 or in a third device (not shown in the drawings) in the system, instead of within the first device 100. If the processing unit 300 is located outside of the first device 100, it may transmit control information to the first device 100.

In the above mentioned embodiments, the first orientation measuring unit 110 comprises an accelerometer. An accelerometer gives an inclination. In some embodiments, the accelerometer can be supplemented with one or more additional sensors (e.g. compass) to give another angle relative to the earth. The inclination relative to the earth is already one angle that can be useful to modify behaviour of the device. When knowing the angle also in the horizontal plane (a north-finder or magnetic compass) from the orientation measuring units, the full orientation relative to the earth is known.

In some embodiments, the first orientation measuring unit 110 may comprise a gyroscope, a digital inclinometer, or the like, instead of an accelerometer. In some embodiments, the first orientation measuring unit 110 may comprise at least one sensor suitable for measuring an orientation of the first device 100 relative to the earth.

In some embodiments, the first position measuring unit 120 may comprise a laser-distance sensor or an ultrasonic sensor or the like.

In some embodiments, the first communication unit 130 and/or the second communication unit 230 may be at least one of: infrared interface, Wi-Fi interface, ZigBee interface, or the like, instead of a Bluetooth interface.

In embodiments of the invention, the first device 100 may be any one of: an electric shaver, a beard trimmer, an electric toothbrush, a hair dryer, a beauty appliance, or any other handheld devices to be used in conjunction with a second device 200. For example, when the first device 100 is embodied as a hair dryer to provide hot airflow to the hair of the user, a temperature and/or intensity of the airflow provided by the hair dryer may be adjusted based on the relative orientation of the hair dryer to the second device 200. If it is detected that the hair dryer has an orientation in which it is pointing directly at the user's head, the temperature of the airflow of the hair dryer can be reduced in response.

In some embodiments, the second device 200 may comprise two or more components, each worn by the user. In such embodiments, the second device 200 could comprise multiple orientation sensors (e.g. accelerometer) at different locations.

The second device 200 in some embodiments may be embodied as an orientation tracking device comprised within an ear clip, a headband, a necklace, a bracelet, or the like, which may be suitable for fixing to a certain body part of the user such that the orientation of the second device is indicative of the orientation of the body part of the user. The second device may be any device worn by the user (or attached or clamped to the user). In some embodiments, the second device may be held by the user, as long as the user holds the second device motionless relatively to their body (e.g. motionless against a relevant body part).

Alternatively, in some embodiments, it may be the first device that is worn by the user and the second device that is free to move (and, for example, have its functionality adjusted based on orientation).

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A system for determining an orientation of a first device relative to a user, comprising:
    the first device including a first orientation measuring unit comprising an accelerometer;
    a second device associated with the user such that an orientation of the second device is indicative of an orientation of a body part of the user, the second device including a second orientation measuring unit comprising an accelerometer; and
    a processor configured to calculate an orientation of the first device relative to the second device by comparing orientation of the first device relative to the earth with orientation of the second device relative to the earth;
    wherein the first device further comprises a position measuring unit configured to measure a position of the first device relative to the second device;
    wherein the system is configured to: determine a position change in the position of the first device over a time period using the position measuring unit; determine an acceleration of the first device due to the position change measured over time; and subtract the acceleration due to the position change from acceleration measurements of the accelerometers of the first orientation measuring unit and the second orientation measuring unit to determine the orientations of the first and second devices relative to the earth;
    wherein the processor is configured to calculate the orientation of the first device relative to the second device by performing geometric subtraction of the orientation of the first device relative to the earth and the orientation of the second device relative to the earth.

2. The system of claim 1, wherein the first device is configured to adjust a functionality of the first device based on the orientation of a first device relative to the user.

3. The system according to claim 1, wherein the first device further comprises a first communication unit, and the second device further comprises a second communication unit, wherein the second communication unit is configured to transmit the orientation of the second device relative to the earth to the first communication unit.

4. The system according to claim 1, wherein the first orientation measuring unit further comprises at least one of: a gyroscope, and a digital inclinometer, and the second orientation measuring unit further comprises, a gyroscope, compass, a north-finder, and a digital inclinometer.

5. The system according to claim 1, wherein the processor is located in at least one of: the first device, the second device, and a third device.

6. The system according to claim 1, wherein the first position measuring unit comprises an electromagnetic field sensor or a laser-distance sensor.

7. The system of claim 1, wherein the first device is further configured to adjust a functionality of the first device based on the orientation of the first device relative to the second device and based on the position of the first device to relative the second device.

8. The system according to claim 1, wherein the first device is a personal appliance including any one of an electric shaver, a hair clipper, a beard trimmer, an electric toothbrush, a hair dryer, skin care device, cleansing appliance, and a beauty appliance.

9. The system according to claim 1, wherein the second device is configured to be worn by the user on the body part.

10. A system for determining an orientation of a first device relative to a user, comprising:
the first device having a position measuring unit and a first accelerometer;
a second device associated with the user such that an orientation of the second device is indicative of an orientation of a body part of the user, the second device having a second accelerometer, the position measuring unit being configured to measure a position of the first device relative to the second device; and
a processor configured to:
determine a position change in the position of the first device over a time period using the first accelerometer,
determine an acceleration of the first device due to the position change measured over time,
subtract the acceleration due to the position change from acceleration measurements of the accelerometers of the first orientation measuring unit and the second orientation measuring unit to determine orientations of the first and second devices relative to earth, and
calculate an orientation of the first device relative to the second device by comparing the orientation of the first device relative to the earth with the orientation of the second device relative to the earth, wherein the comparing includes performing geometric subtraction of the orientation of the first device relative to the earth and the orientation of the second device relative to the earth.

11. The system of claim 10, wherein the first device is configured to adjust a functionality of the first device based on the orientation of a first device relative to the user.

12. The system of claim 10, wherein the first device is configured to adjust a functionality of the first device based on the orientation of the first device relative to the second device and based on the position of the first device relative to the second device.

13. The system of claim 10, wherein the first device includes at least one of a gyroscope, and a digital inclinometer, and the second device includes at least one of a gyroscope, compass, a north-finder, and a digital inclinometer.

14. The system of claim 10, wherein first position measuring unit includes an electromagnetic field sensor or a laser-distance sensor.

15. The system of claim 10, wherein the first device is a personal appliance including any one of an electric shaver, a hair clipper, a beard trimmer, an electric toothbrush, a hair dryer, skin care device, cleansing appliance, and a beauty appliance.

16. The system of claim 10, wherein the second device is configured to be worn by the user on the body part.

17. A method for determining an orientation of a first device relative to a user, comprising acts of:
measuring a position of the first device relative to a second device, the second device associated with the user such that an orientation of the second device is indicative of an orientation of a body part of the user;
determining by a processor a position change in the position of the first device over a time period;
determining an acceleration of the first device due to the position change;
subtracting the acceleration due to the position change from acceleration measurements of accelerometers of the first and the second devices to determine orientations of the first and second devices relative to earth; and
calculating an orientation of the first device relative to the second device by comparing the orientation of the first device relative to the earth with the orientation of the second device relative to the earth, wherein the comparing includes performing geometric subtraction of the orientation of the first device relative to the earth and the orientation of the second device relative to the earth.

18. The method of claim 17, further comprising an act of adjusting a functionality of the first device based on at least one of the orientation of the first device relative to the second device and the position of the first device relative to the second device.

19. The method of claim 17, wherein the act of determining by the processor the position change in the position of the first device over a time period uses an accelerometer of the first device.

20. The method of claim 17, wherein the position change is measured over time using an accelerometer of the first device.

* * * * *